US006568873B1

(12) United States Patent
Peterson

(10) Patent No.: US 6,568,873 B1
(45) Date of Patent: May 27, 2003

(54) IN-LINE CONNECTOR FOR WINDOW SPACER FRAME TUBING

(76) Inventor: Wallace H. Peterson, 5312 23rd Ave. W., Everett, WA (US) 98203

( * ) Notice: Subject to any disclaimer, the term of this patent is extended or adjusted under 35 U.S.C. 154(b) by 0 days.

(21) Appl. No.: 09/357,490

(22) Filed: Jul. 20, 1999

(51) Int. Cl.[7] .................................................. F16B 7/14
(52) U.S. Cl. ........................ 403/305; 403/300; 403/301
(58) Field of Search ................................ 403/305, 300, 403/301, 302, 292, 297, 294, 326, 329

(56) References Cited

U.S. PATENT DOCUMENTS

| | | | | |
|---|---|---|---|---|
| 3,643,989 A | * | 2/1972 | Sattler | 403/292 X |
| 4,373,829 A | * | 2/1983 | Braxell | 403/292 X |
| 5,127,762 A | * | 7/1992 | Havlovitz | 403/300 X |
| 5,560,731 A | | 10/1996 | Kronenberg | |
| 5,927,389 A | * | 7/1999 | Gonsalves et al. | 403/329 X |

FOREIGN PATENT DOCUMENTS

| | | |
|---|---|---|
| EP | 0339319 A1 | 2/1989 |
| EP | 0651124 A1 | 5/1995 |
| GB | 2297349 A | 7/1996 |

* cited by examiner

*Primary Examiner*—Lynne H. Browne
*Assistant Examiner*—John R. Cottingham
(74) *Attorney, Agent, or Firm*—Todd N. Hathaway

(57) ABSTRACT

A self-centering line connector for insulated window spacer frame tubing. There is an elongate connector body having first and second ends. First and second ramps extend upwardly from the connector body towards a mid-point of the connector body. The base ends of the ramp portions are yieldingly mounted to the connector body, and the free ends have perpendicularly extending stop surfaces. Either end of the connector can be inserted into the open end of a section of spacer frame tubing. As this is done, the first ramp portion is depressed by the web of the tubing so as to permit the tubing to pass thereover until insertion is arrested by the end of the tubing coming up against the stop surface of the second ramp member, at approximately the mid-point of the connector body. The other end of the connector is then inserted into a second section of tubing, which depresses the second ramp member so that the end of the second section of tubing can be pressed into abutment with the end of the first, with the connector body being located centrally between the two sections of tubing.

18 Claims, 4 Drawing Sheets

IN-LINE CONNECTOR FOR WINDOW SPACER FRAME TUBING

BACKGROUND OF THE INVENTION a. Field of the Intention

The present invention relates generally to spacer frame bars for use in insulated windows, and, more particularly, to an in-line connector for joining tubular space bars in end-to-end relationship.

b. Background Art

As is well known in the art, insulated windows and similar insulated glass panels are ordinarily constructed using two panes of glass which are maintained in spaced, parallel relationship by means of a spacer frame. The spacer frame, typically a rectangular structure which extends around the perimeter of the window, serves to create the insulating gap between the two panes, which is usually filled with air or another gas having low thermal transmission qualities.

The spacer frame itself is usually constructed of a series of straight, tubular spacer bars. These spacer bars are commonly formed of metal (e.g., aluminum or steel) and have a hollow interior for holding a desiccant material which serves to remove any moisture from the interpane air space.

The tubular spacer frame bar material is ordinarily supplied in long "sticks" having a standard length, e.g., twenty feet. In order to construct the spacer frame, the spacer material is cut to the desired length, and the various pieces are then assembled to construct the frame. In order to form the connections between the ends of the pieces while still maintaining a continuous, uninterrupted external profile, an internal connector is inserted in the end of one tubular piece, and the other tubular piece is then pressed over the other end of the connector.

In some instances the ends of the spacer pieces meet at a corner of the frame, in which case an angled corner connector is used to form the joint (in some forms of construction the corners are made by bending the tubing, rather than by using a corner connector). In other instances, however, it is necessary to form a butt or "in-line" connection between the adjoining pieces.

Forming an in-line connection of this type in an efficient yet effective manner has long presented a problem for the industry. Such connections are usually formed manually, and the problems existing in the prior art are illustrated in FIGS. 2–3. As can be seen, one common form of prior art in-line connector 01 is little more than an elongate plug having a cross-sectional configuration which corresponds to the interior of the spacer tubing. To form the connection, the operator grasps the connector 01 in his fingers and presses this into the open end 02 of the first spacer piece 03. The opposite end of the connector is then inserted into the open end 04 of the other spacer piece 05, and the two pieces are then shoved together until the ends 02, 04 butt up against one another.

This forms the in-line joint 06 which is shown in FIG. 3. As can be seen, however, the problem is that the connector piece 01, lacking any form of positive stop, tends to end up being very much off-center in the connection, so that there is insufficient protrusion 07 into one or the other of the spacer pieces. This can happen very easily as a result of the operator pushing the connector 01 too far into the end of the first spacer piece. Moreover, one piece of the spacer material almost always forms a tighter fit or exerts more friction against the connector than the other, owing to manufacturing tolerances or uneven alignment in the operator's hands; thus, even if the connector is inserted to the correct depth initially, the uneven fit tends to cause the connector to be driven deeper into one piece or the other as the two spacer pieces are pressed together.

As a result, the connector frequently ends up so misaligned that it fails to extend the necessary distance into one spacer or the other to form a stable connection. Consequently, the connections often separate when the operator goes to assemble the window, i.e., the ends of the two spacer pieces pop apart. At best, this necessitates taking the time to remove the connector piece and re-install it correctly. Often, however, the thin-walled spacer pieces are damaged in the process, so that the pieces (or sometimes the entire spacer frame) must be discarded. Either way, misalignment of the connector piece can lead to wasteful delays in a manufacturing operation.

Accordingly, there exists a need for an in-line connector for tubular spacer frame pieces which avoids the problems of misalignment described above. Furthermore, there exists a need for such an in-line connector which is quickly and easily installed in a manufacturing operation. Still further, there exists a need for such a connector which is reliable in operation and economical to manufacture.

SUMMARY OF THE INVENTION

The present invention has solved the problems cited above, and is a connector for window spacer frame tubing.

Broadly, this comprises an elongate connector body having first and second ends, and at least one stop member which is mounted to the connector body. The stop member comprises an inclined ramp portion which protrudes from the connector body and which is mounted so as to be yieldingly depressible in response to the first end of the body being inserted into a first section of spacer frame tubing. A stop portion is formed on an outer end of the ramp portion, and projects generally perpendicularly from the connector body so as to abut an end of a second section of spacer frame tubing in response to the second end of the connector body being inserted therein.

The stop portion is located proximate a mid-point of the connector body, so that the stop portion abuts the end of the second section of tubing so as to arrest insertion proximate the mid-point of the connector body. In response to the other end of the connector body being inserted into the other section of tubing, the ramp portion of the stop member is depressed into the interior of the tubing so as to permit a butt end of the first section of tubing to be pressed into engagement with the butt end of the second section of tubing.

The ramp portion of the stop member may comprise a base end which is joined to the connector body so as to permit the ramp portion to bend downwardly towards the body in response to downward pressure. The stop portion, in turn, may comprise an end wall which extends downwardly from the free end of the ramp portion towards the connector body.

The connector body may further comprise an upper wall which is configured to pass closely under an upper web of the spacer frame tubing. The base of the ramp portion may be joined to the upper wall of the connector body, and the connector body may further comprise a recess for receiving the stop and ramp portions as these are depressed towards the body. The recess may comprise a hollow interior formed in the connector body generally beneath the upper wall thereof.

The connector body may further comprise first and second side wall portions for internally engaging first and second side walls of the spacer frame tubing, the side wall portions extending downwardly from the upper wall of the connector body so as to define the hollow interior thereof.

The connector may comprise first and second stop members, with the ramp portions thereof extending in opposite directions towards the first and second ends of the connector body, and the stop portions facing in opposite directions towards the mid-point of the body. Thus, in response to the first end of the connector being inserted into a first section of the tubing, the upper web of the tubing depresses the ramp and stop portions of the first stop member so as to pass thereover, until the end of the first section of tubing abuts the stop portion of the second stop member so as to arrest insertion proximate the mid-point of the connector. Then, in response to the second end of the connector being inserted into a second section of the tubing, the upper web of the tubing depresses the ramp and stop portions of the second stop member so as to pass thereover, until the end of the second section of tubing abuts the end of the first section of tubing.

The stop members may be formed integrally with the connector body. The connector body and stop members may be formed of a resilient plastic material or of a malleable metal material which permits the ramp portions to bend downwardly at the base ends thereof.

These and other features and advantages of the present invention will be apparent from a reading of the following detailed description in conjunction with the accompanying drawings.

DETAILED DESCRIPTION a. Structure

Figure 1:
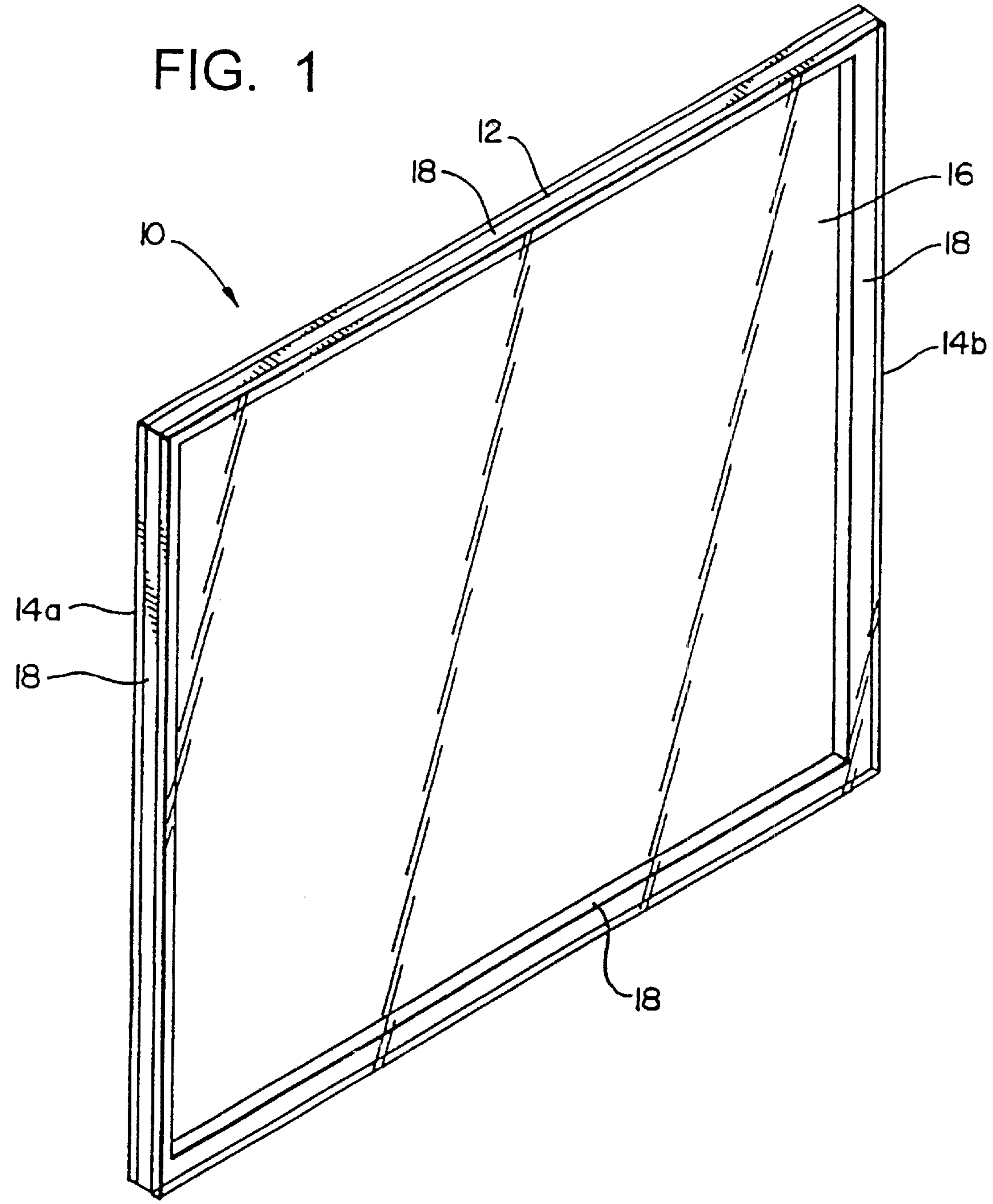
FIG. 1 is a perspective view of an insulated glass window having a spacer frame constructed of tubular spacer bars, the spacer bars being joined by in-line connectors in accordance with the present invention.
Figure 2:
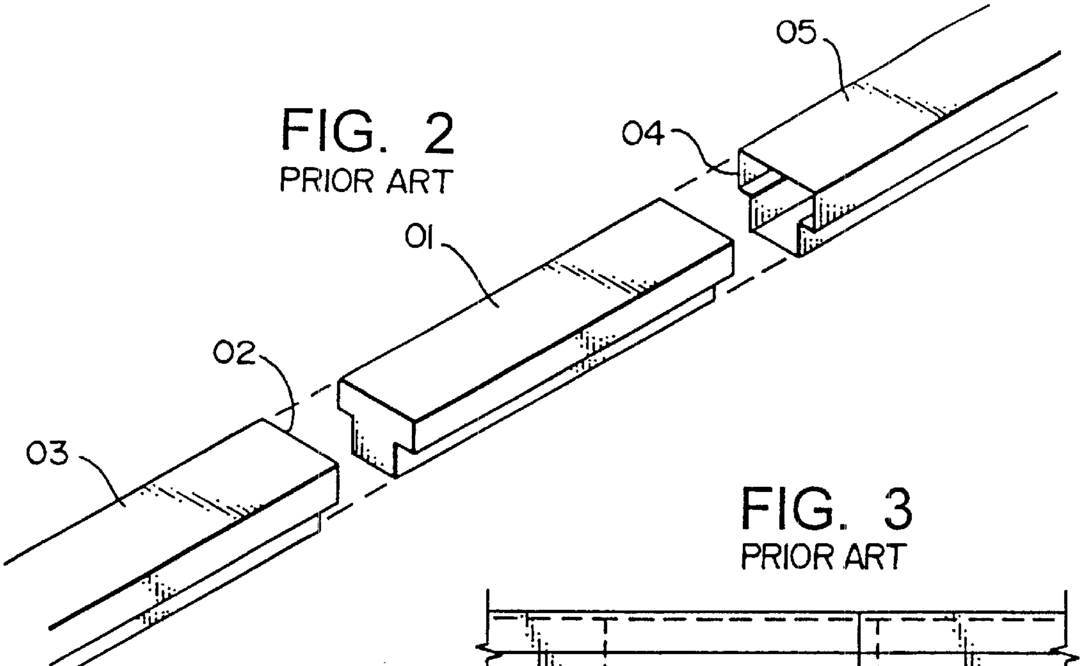
FIG. 2 PRIOR ART
FIG. 2 is a perspective view of the ends of first and second tubular spacer bars as these are being joined by a prior-art in-line connector.
Figure 3:
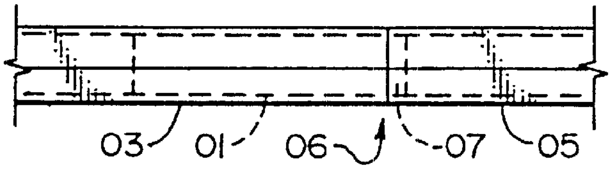
FIG. 3 PRIOR ART
FIG. 3 is an elevational view of the connection which is formed by the prior-art components of FIG. 2, showing the misalignment of the connector within the ends of the tubular spacer pieces.

FIG. 1 shows an insulated window 10 in accordance with the present invention. As used in this description and the appended claims, the term "window" includes all insulated glass panels having this general form of construction, whether intended for viewing or admission of light, or for other purposes.

As can be seen, insulated window 10 is generally conventional in its overall configuration, being constructed using a rectangular spacer frame 12 which extends around the perimeter of the window, and which maintains the first and second glass panes 14*a*, 14*b* in spaced relationship so as to form an insulating space 16 which is filled with air or other insulating gasses.

As was described above, the spacer frame 12 is constructed of a series of tubular spacer bars 18. In most instances the tubular spacer bars are formed of comparatively thin-walled, roll-formed metal, such as tubular steel or aluminum alloy, for example, although in other cases the spacer bars may be formed of tubular plastic, fiberglass, or other materials. For purposes of illustration, the bottom spacer bar in frame 12 will be shown as having a two-piece construction, i.e., being made up of first and second spacer bar pieces joined in end-to-end relationship. It will be understood, however, that the in-line connections to which the present invention is directed may occur anywhere in the frame, or in mullions or other bars which extend across the faces of the panes.

Figure 4:
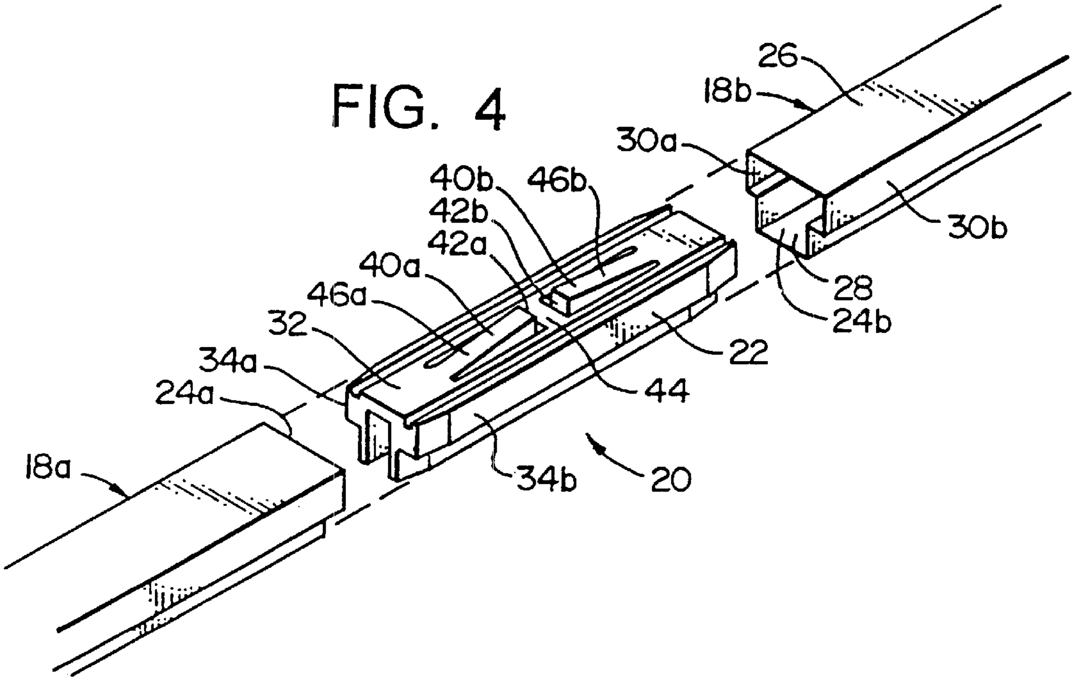
FIG. 4 is a perspective view, similar to FIG. 2, of an in-line connector in accordance with the present invention showing the connector as this is being used to join the ends of first and second tubular spacer pieces.

FIG. 4 thus shows an in-line connector 20 in accordance with the present invention, as this is used to join first and second sections 18*a*, 18*b* of the tubing which forms spacer frame 12. As can be seen, the connector 20 includes an elongate body 22 having an exterior which is configured to be received in close-fitting engagement with the interiors 24*a*, 24*b* of the spacer pieces. The body of the connector is formed of a material having a suitable degree of rigidity so as to maintain the two spacer pieces in axial alignment when the assembly is completed, but which is preferably still somewhat yielding and flexible, such as molded plastic or stamped sheet metal, for example.

Since it is intended to fit inside the spacer tubing, the exterior shape of the connector will vary somewhat from one embodiment to another, depending on the configuration of the tubing with which it is designed to be used. In the embodiment which is illustrated in FIG. 4, the tubing has a somewhat "T" -shaped configuration, in that this includes a broad upper web 26 (which faces towards the interpane space 16), a generally parallel lower web 28, and outwardly-stepped side webs 30*a*, 30*b*, the latter being configured to engage and support the glass panes 14*a*, 14*b*. The connector piece 20 thus has a corresponding "T" -shaped configuration, with a broad, somewhat planar upper wall 32 which fits inside and engages the top web of the spacer tubing, and stepped side walls 34*a*, 34*b* which likewise engage the side webs of the tubing.

As can be seen in FIG. 4, connector 20 also includes first and second inclined stop members 40*a*, 40*b* which project upwardly above the general plane of the top wall 32. The inclined stop members have generally vertical end faces 42*a*, 42*b* which are arranged to face one another across a small central gap 44, and ramp portions 46*a*, 46*b* which slope downwardly from the end faces towards opposite ends of the connector body. The end faces 42*a*, 42*b* are located proximate the mid-point of the connector body so as to limit insertion of the connector to about one-half its depth in either of the tubing pieces, as will be described in greater detail below. Also, it will be understood that the term "mid-point" and the like, as used in this description and the appended claims, means a point in the lengthwise middle portion of the connector body which is selected to allow the desired amount of insertion of the connector, and may or may not be at or near the exact geometric middle of the connector, depending on the embodiment and on relevant design considerations.

The angle of the ramp portions 46*a*, 46*b* is preferably relatively shallow for ease of use, and while this will vary somewhat depending on the configuration of the components and the qualities of the materials used, an upward angle of about 5–10° is eminently suitable for many embodiments of the present invention.

Figure 5:
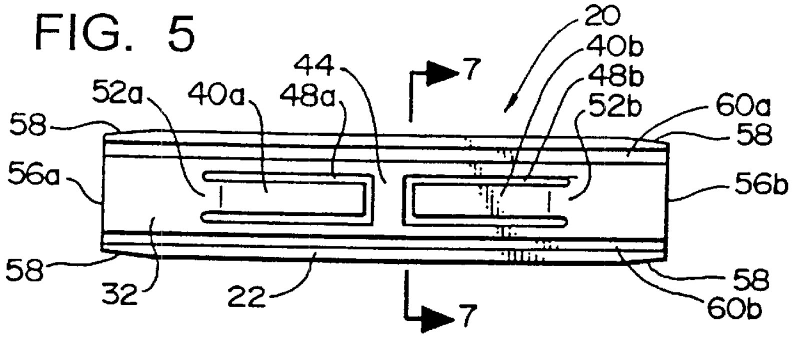
FIG. 5 is a plan view of the in-line connector of FIG. 4, showing the first and second inclined stop members which are formed in the upper wall thereof.
Figure 6:
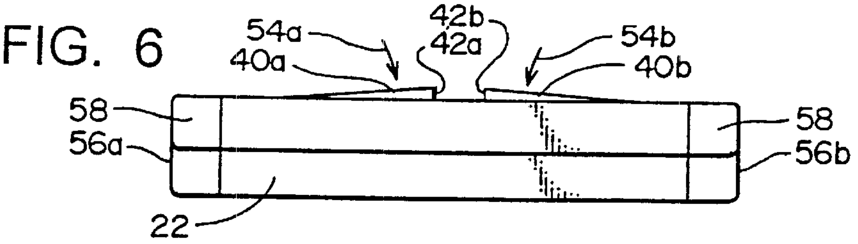
FIG. 6 is an elevational view of the in-line connector of FIGS. 4–5, showing the manner in which the inclined stop members protrude above the upper surface thereof.
Figure 7:
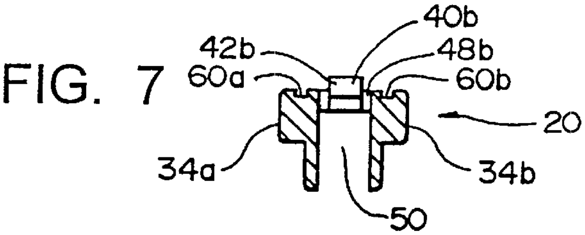
FIG. 7 is an cross-sectional view of the in-line connector of FIGS. 4–6, taken along 7—7 in FIG. 5, showing the relationship of the inclined stop members to the underlying interior of the connector.

As is shown in FIG. 5, each of the inclined stop members 40*a*, 40*b* is bordered on three sides by a "U" shaped cut 48*a*, 48*b* which is formed in the upper wall 32 of the connector body and which extends downwardly into an interior cavity 50 (see also FIG. 7). As a result, each of the inclined stop members 40*a*, 40*b* is supported only at its base end 52*a*, 52*b*, so that the ramp portions 46*a*, 46*b* and the faces at the free ends thereof are able to bend or flex downwardly under pressure, as indicated by arrows 54*a* and 54*b* in FIG. 6.

As can also be seen in FIGS. 5 and 6, the longitudinal ends 56*a*, 56*b* of the connector 20 are preferably provided with chamfers or bevels 58 to ease insertion of the connector piece into the open ends of the spacer pieces. Furthermore, longitudinal relief grooves 60*a*, 60*b* may be formed in the upper wall 32 of the connector, on either side of the longitudinally extending stop members 40*a*, 40*b*, so as to help ensure that the upper web of the spacer tubing will lie flat against the upper surface of the connector.

b. Use.

Figure 8:
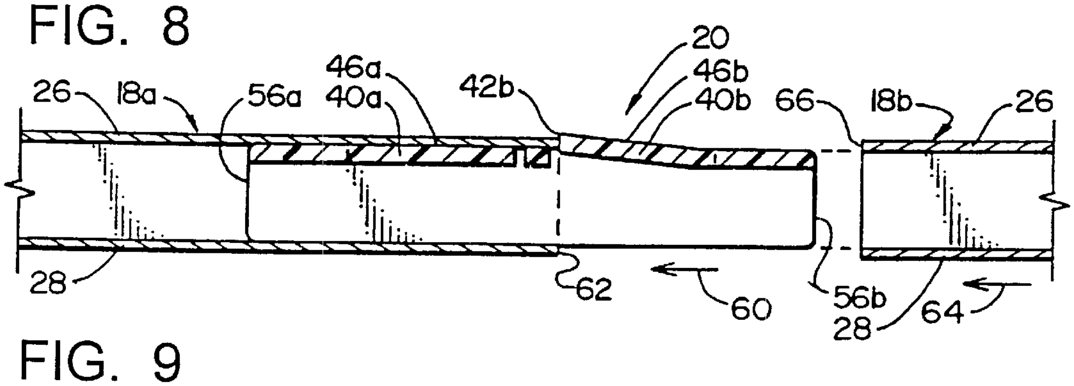
FIG. 8 is a cross-sectional view of the connector and spacer pieces of FIG. 4, showing the manner in which a first one of the stop members arrests insertion of the in-line connector at the proper depth within the end of a tubular spacer piece.
Figure 9:
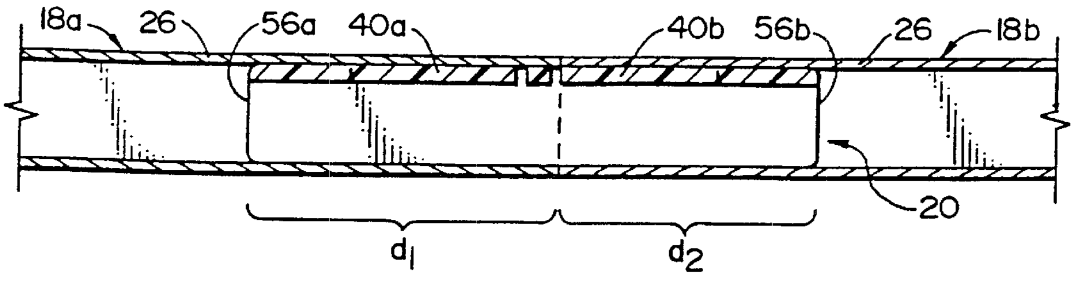
FIG. 9 is a cross-sectional view similar to FIG. 8, showing the manner in which the stop member holds the connector in the proper position as the connector is inserted into the end of a second tubular spacer piece, until the Ends of the two spacer pieces come into abutment with one another.

FIGS. 8–9 illustrate the manner in which the in-line connector 20 is used to join first and second pieces of tubular spacer bar in a quick and efficient manner, while keeping the connector properly centered between the ends of the two pieces.

As can be seen in FIG. 8, the first step is to insert the first end 56*a* of the connector into the first section of tubing 18*a*. To do this, the operator simply grasps the opposite end 56*b* of the connector between his fingers and presses the connector into the end of the tubing, in the direction indicated by arrow 60 in FIG. 8. As this is done, the upper web 26 of the spacer rides up the ramp portion 46*a* of the first stop member 40*a*, depressing the latter into the interior of the connector in the direction indicated arrow 54*a* in FIG. 6. The first stop member 40*a* is thus depressed to the horizontal position shown in FIG. 8, so that the upper web 26 of the spacer tubing is able to pass thereover more or less freely.

When the butt end 62 of the first spacer piece reaches the midpoint of the connector 20, however, it comes up against the vertical end face 42*b* of the second, opposing stop member 40*b*. This arrests further relative movement of the connector piece 20, preventing insertion beyond the approximate halfway point. Because the stop member 40*b* is loaded primarily in compression against the lip 62 of the tubing, it is able to effectively resist any further movement of the connector, even though the stop member is easily flexed or bent by pressure in a lateral, i.e., downward, direction.

To complete the assembly, the operator grasps the first piece of tubing 18*a* and uses the other hand to press the other piece 18*b* over the second end 56*b* of the connector, in the direction indicated by arrow 64 in FIG. 8. As this is done, there is a certain degree of friction between the connector 20 and the inside of the second piece of tubing 18*b*, tending to force the connector deeper into the first piece 18*a*. In the present invention, however, the end face 42*b* of the stop member prevents any such motion, thereby holding the connector in its correctly centered position.

With further insertion, the upper web 26 of the second spacer piece rides up over the ramp portion 46*b* of the second stop member 40*b*, depressing this downwardly in the same manner as described above. The height of the end face 42*b*, however, is selected so that this will remain in abutment with the lip of the first spacer piece until the lip 66 of the second spacer piece moves into close proximity therewith. Furthermore, the end face 42*b* develops a degree of frictional engagement against the lip 62 of the first spacer piece, thereby preventing premature downward displacement of the end of the second stop member 40*b*.

As the second spacer piece nears the end of its travel, the downward pressure exerted by web 26 forces the end face of the stop member downwardly out of engagement with the lip 62 of the first spacer piece, completing movement of the second stop member 40*b* to the depressed, horizontal configuration which is shown in FIG. 9. As this happens, the end face 42*b* of the stop member disengages from the lip of the spacer with an audible "snap", thereby providing the operator with an indication that formation of the assembly is complete. The end of the second spacer piece then slides the final fraction of an inch into abutment against the end of the first piece 18*a*.

Since disengagement of the stop surface thus occurs only at the very end of travel, there is little or no opportunity for the connector piece 20 to move from its original position. As a result, the embedded depths $d_1$ and $d_2$ of the first and second ends 56*a*, 56*b* of the connector are almost equal, differing only by the width of the bridge piece 44 or other gap between the two end surfaces 42*a*, 42*b* of the two stop members. The connector thus forms a very strong, stable joint is between the two pieces of spacer tubing members, eliminating the separation problems described above.

It will be understood that in some embodiments of the present invention there may be only a single inclined stop member, rather than the two stop members 40*a*, 40*b* which are shown in FIGS. 5–9; the use of two inclined stop members, however, renders the connector fully reversible, thereby eliminating any possibility of inserting the wrong end of the connector piece in the tubing. Furthermore, although the embodiments illustrated herein have both stop members formed on the upper surface thereof, it will be understood that other embodiments may have the stop members formed on opposite or adjacent sides of the spacer body.

c. Stamped Metal Construction

The embodiment shown in FIGS. 4–9 is eminently suited to manufacture as a molded item, i.e., for fabrication in injection-molded plastic or a similar material. FIGS. 10–13, in turn, illustrate a connector 70 in accordance with the present invention which is stamped from a piece of sheet metal material.

The overall configuration of connector 70 is generally similar to that described above, in that this has an elongate, generally rectangular body 72 with first and second ends 74*a*, 74*b*, a generally planar top wall 76, and first and second depending side walls 78*a*, 78*b*. In combination, these members define more or less an inverted channel configuration having a downwardly extending opening 80 in its underside.

As with the embodiment described above, the side walls 78*a*, 78*b* of the connector piece fit inside and engage the corresponding side webs 30*a*, 30*b* of the spacer tubing, and the top wall 76 similarly fits under and engages the upper web 26 of the tubing. Also similar to the embodiment described above, the connector piece 70 includes a pair of inwardly-facing inclined stop members 82*a*, 82*b*, each of which includes a ramp portion 84*a*, 84*b* a vertical end face 86*a*, 86*b*.

Figure 11:
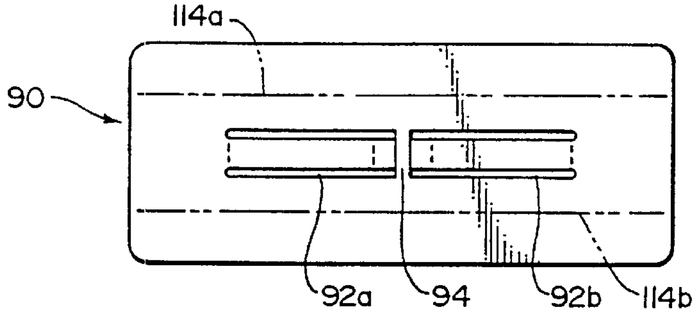
FIG. 11 is a plan view of a sheet metal blank with the initial cuts having been made therein for formation of the inclined stop members of the connector of FIG. 10.

As can be seen in FIG. 11, the metal spacer 70 is suitably formed from a single, generally rectangular blank 90 which is cut from a sheet of metal material (e.g., steel or aluminum alloy) having a suitable thickness. Two U-shaped cuts 92*a*, 92*b* are formed in a central area of the blank, which correspond to the "U" shaped slots or cuts 48*a*, 48*b* described above. In some embodiments the U-shaped cuts may be separate from one another, as shown in FIG. 11, so as to leave a central, narrow bridge piece 94 which extends between the ends of the two cuts, while in other embodiments there may be a single "H" shaped cut which leaves no such central bridge piece.

Figure 12:
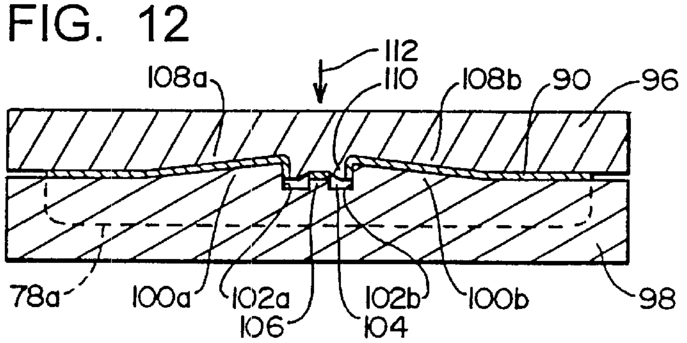
FIG. 12 is a cross-sectional view of the metal blank of FIG. 10, showing the manner in which this is stamped between dies to form the in-line connector of FIG. 10.

As is shown in FIG. 12, the blank 90 is placed between upper and lower dies 96 and 98 and then stamped to the desired configuration. The lower die 98 includes first and second upwardly sloped ramp portions 100*a*, 100*b*, which terminate in inwardly faced vertical end walls 102*a*, 102*b* which extend downwardly into a central recess 104. The recess 104 also includes a transverse wall section 106 for supporting the bridge piece 94. The upper die, in turn, is formed with corresponding, upwardly-sloped channel portions 108*a*, 108*b*, and a central, downwardly projecting plug portion 110 which is configured to be received in recess 104.

Figure 10:
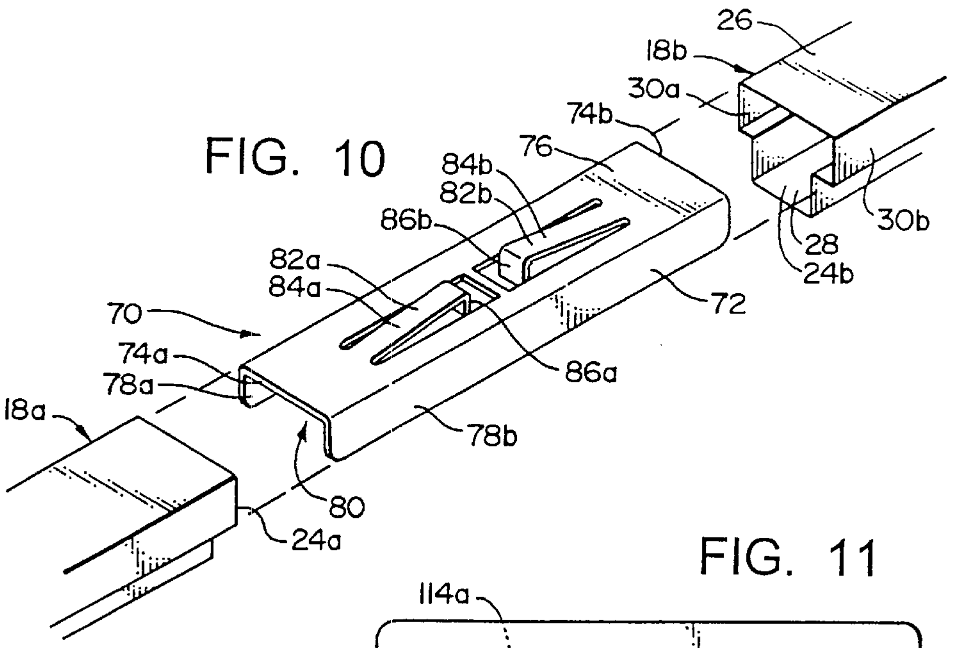
FIG. 10 is a perspective view of an in-line connector in accordance with an embodiment of the present invention in which the connector is formed of stamped sheet metal, showing the Manner in which this is used to connect first and second tubular spacer pieces.

Thus, as the upper and lower dies 96, 98 are forced together in the direction indicated by arrow 112, the ramp and channel portions 100*a*, 100*b* and 108*a*, 108*b* of the dies cooperate to force the material into the shape of the inclined ramp portions 84*a*, 84*b* (see FIG. 10). Simultaneously, the plug portion 110 of the upper die bends the material at the ends of the ramp portions downwardly, against the vertical walls 102*a*, 102*b* of the lower die, thereby forming the end walls 86*a*, 86*b* of the inclined stop members. Also, outer wall portions (not shown) of the upper die bend the outer edges of the blank 90 downwardly along lines 114*a*, 114*b* (see FIG. 11), so as to form the depending wall portions 78*a*, 78*b* of the connector piece.

Figure 13:
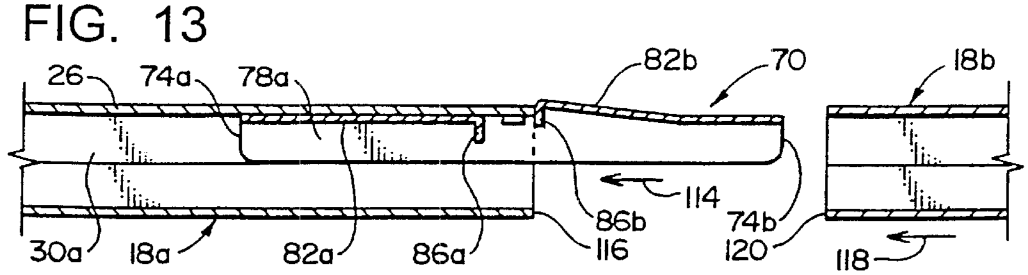
FIG. 13 is a cross-sectional view, similar to FIG. 8, showing a first end of the connector of FIG. 10 having been inserted in a first tubular spacer piece, and the other end of the connector being inserted into a second spacer piece.

Use of the metal in-line connector 70 is substantially the same as described above. As is shown in FIG. 13, the first end 74*a* of the connector is inserted in the open end of the first spacer piece 18*a* in the direction indicated by arrow 115, so that the side walls 78*a*, 78*b* and top wall 76 of the connector fit into and engage the corresponding side and top webs 30*a*, 30*b* and 26 of the spacer member. As this is done, the first inclined stop portion 82*a* of the connector is depressed to a generally horizontal position and slides under the upper web of the spacer, as is shown in FIG. 13.

Further insertion of the connector piece brings the vertical end wall 86*b* of the second stop member into abutment with the edge 116 of the first spacer piece, thereby arresting insertion of the connector piece at the correct depth. The open end of the second spacer piece 18*b* is then pressed over the protruding end 74*b* of the connector piece 70, in the direction indicated by arrow 118 in FIG. 13. As this is done, the end wall 86*b* of the stop member holds connector 70 stationary, until the edge 120 of the second connector piece moves into end-to-end abutment against the edge 116 of the first spacer piece 18*a*.

It is to be recognized that various alterations, modifications, and/or additions may be introduced into the constructions and arrangements of parts described above without departing from the spirit or ambit of the present invention as defined by the appended claims.

What is claimed is:

1. A connector for window spacer frame tubing, said connector comprising:

an elongate connector body having first and second ends; and at least one stop member mounted to said connector body, said stop member comprising:

an inclined ramp portion having a length that is greater than a width thereof, which extends outwardly from said connector body and which is mounted so as to be yieldingly depressible into said body in response to said first end of said body being inserted into a first section of spacer frame tubing; and a stop portion formed on an outer end of said ramp portion, said stop portion projecting from said connector body and facing towards said second end of said connector body so as to abut an end of a said second section of spacer frame tubing in response to said second end of said connector body being inserted therein;

said stop portion being located proximate a mid-point of said connector body and said second end of said connector body being freely insertable in said spacer frame tubing up to said stop portion;

so that said stop portion abuts said end of said second section of tubing so as to arrest insertion of said connector proximate said mid-point of said connector body, and said ramp portion is depressed into an interior of said first section of tubing so as to permit an end of said first section of tubing to be pressed into abutment against said end of said second section of tubing.

2. The connector of claim 1, wherein said ramp portion comprises:

a base end of said ramp portion which is joined to said connector body so as to permit said ramp portion to be bent downwardly towards said connector body in response to pressure which is applied downwardly against said ramp portion.

3. The connector of claim 2, comprising:

first and second said stop members, said ramp portions of said stop members extending in opposite directions towards said first and second ends of said connector body and said stop portions of said stop members facing towards one another proximate said mid-point of said connector body.

4. The connector of claim 2, wherein said connector body comprises:

an upper wall portion which is configured to pass closely under an upper web of a section of spacer frame tubing as said connector body is inserted therein, said base end of said ramp portion being joined to said upper wall portion of said connector body.

5. The connector of claim 4, wherein said connector body further comprises:

a recess formed in said connector body for receiving said stop portion as said ramp portion is depressed towards said connector body in response to said connector body being inserted into a section of said tubing.

6. The connector of claim 5, wherein said recess in said connector body comprises:

a hollow interior formed in said connector body generally beneath said upper wall portion thereof.

7. The connector of claim 6, wherein said connector body further comprises:

first and second side wall portions for internally engaging first and second side webs of a section of spacer frame tubing, said side wall portions extending downwardly from edges of said upper wall portion of said connector body so as to define said hollow interior thereof.

8. A connector for window spacer frame tubing, said connector comprising:

an elongate connector body having first and second ends and an upper wall for passing closely under an upper web of said tubing as said connector body is inserted therein; and first and second stop members facing in opposite directions, each said stop member comprising:

an elongate, shallowly inclined ramp portion having a length that is greater than a width thereof, which extends from a base end which is yieldingly mounted to said connector body proximate an end of said connector body so as to be generally flush with said upper wall thereof, to a free end which protrudes above said upper wall proximate a mid-point of said connector body, said ramp portion being free from attachment to said connector body along first and second sides and said free end thereof; and a substantially vertical end face formed on said free end of said ramp portion and extending downwardly therefrom towards said upper wall of said connector body;

said vertical end face projecting upwardly from said connector body to a height above an upper surface of said spacer frame tubing and downwardly to a depth below an upper surface of said connector body;

said end face on said first stop member facing said end face on said second stop member on opposite sides of said mid-point of said connector body and each end of said connector body being freely insertable in said spacer frame tubing up to that stop member which faces towards the inserted end of said connector body;

so that in response to said first end of said connector body being inserted into a first section of spacer frame tubing said upper web of said tubing depresses said ramp and end face portions of said first stop member so as to pass thereover, until an end of said first section of tubing abuts said end face portion of said second stop member so as to arrest insertion of said connector body proximate said mid-point thereof; and so that in response to said second end of said connector body being inserted into a second section of spacer frame tubing said upper web of said tubing depresses said ramp and end face portions of said second stop member so as to pass thereover until an end of said second section of tubing abuts said end of said first section of tubing.

9. The connector of claim 8, wherein said connector body further comprises:

a recess formed in said connector body for receiving said ramp and end face portions of said stop members as said stop members are depressed in response to insertion in said sections of tubing.

10. The connector of claim 9, wherein said recess in said connector body comprises:

a hollow interior formed in said connector body generally beneath said stop members.

11. The connector of claim 10, wherein said connector body further comprises:

first and second side walls which extend downwardly from first and second edges of said upper wall so as to define said hollow interior of said connector body.

12. The connector of claim 11, wherein said side walls of said connector body comprise:

lower edge portions for engaging a lower web of said spacer frame tubing so that said side wall portions maintain said upper wall of said connector body in close-fitting engagement with said upper web of said tubing.

13. The connector of claim 11, wherein said side walls of said connector body are configured to engage and support first and second side webs of said spacer frame tubing.

14. The connector of claim 13, wherein said stop members are formed integrally with said connector body.

15. The connector of claim 14, wherein said stop members and connector body are formed of a resilient plastic material which permits said ramp portions to bend downwardly towards said body at said base ends thereof.

16. The connector of claim 14, wherein said stop members and connector body are formed of a malleable metal material which permits said ramp portions to bend downwardly towards said body at said base ends thereof.

17. The connector of claim 11, wherein said first and second ends of said connector body are bevelled inwardly so as to facilitate insertion of said connector body into said spacer frame tubing.

18. A connector for joining first and second sections of window spacer frame tubing, said connector comprising:

an elongate connector body having first and second ends and an upper wall for passing closely under an upper web of said tubing as said connector body is inserted therein; and first and second stop members facing in opposite directions, each said stop member comprising:

an elongate, shallowly inclined ramp portion having a length that is greater than a width thereof, which extends from a base end which is yieldingly mounted to said connector body proximate an end of said connector body so as to be generally flush with said upper wall thereof, to a free end which protrudes above said upper wall closely proximate a mid-point portion of said connector body, said ramp portion being free from attachment to said connector body along first and second sides and said free end thereof; and a substantially vertical end face formed on said free end of said ramp portion and extending downwardly therefrom towards said upper wall of said connector body;

said vertical end face projecting upwardly from said connector body to a height above an upper surface of said spacer frame tubing and downwardly to a depth below an upper surface of said connector body;

said end face on said first stop member facing said end face portion of said second stop member on opposite sides of said mid-point portion of said connector body, said mid-point portion of said connector body being substantially free of projections between said end face portions of said stop members so that each end of said connector body is freely insertable in said spacer frame tubing up to that stop member which faces towards the inserted end of said connector body;

so that in response to said first end of said connector body being inserted into said first section of spacer frame tubing said upper web of said tubing depresses said ramp and end face portions of said first stop member so as to pass thereover, until an end of said first section of tubing abuts said end face portion of said second stop member so as to arrest insertion of said connector body proximate a mid-point thereof; and so that in response to said second end of said connector body being inserted into said second section of spacer frame tubing said upper web of said tubing depresses said ramp portion and end face of said second stop member so as to pass thereover until an end of said second section of tubing meets said end of said first section of tubing in uninterrupted abutment therewith.

* * * * *